(12) United States Patent
Banno (10) Patent No.: US 9,401,029 B2
(45) Date of Patent: Jul. 26, 2016

(54) MOVING OBJECT DETECTION METHOD (71) Applicant: IHI Corporation, Koto-ku (JP)

(72) Inventor: Hajime Banno, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/638,805

(22) Filed: Mar. 4, 2015

(65) Prior Publication Data

US 2015/0178941 A1    Jun. 25, 2015

Related U.S. Application Data (63) Continuation of application No. PCT/JP2013/073872, filed on Sep. 5, 2013.

(30) Foreign Application Priority Data

Sep. 7, 2012 (JP) .................. 2012-197532

(51) Int. Cl.
*G06K 9/00* (2006.01)
*G06T 7/20* (2006.01)
*B64G 3/00* (2006.01)
*H04N 5/232* (2006.01)
*G06T 7/00* (2006.01)

(52) U.S. Cl.
CPC . *G06T 7/204* (2013.01); *B64G 3/00* (2013.01); *G06T 7/0048* (2013.01); *G06T 7/20* (2013.01); *G06T 7/208* (2013.01); *G06T 7/2033* (2013.01); *H04N 5/23229* (2013.01); *H04N 5/23254* (2013.01); *G06T 2207/10032* (2013.01); *G06T 2207/20076* (2013.01); *G06T 2207/30181* (2013.01); *G06T 2207/30241* (2013.01)

(58) Field of Classification Search
None
See application file for complete search history.

(56) References Cited

U.S. PATENT DOCUMENTS

2003/0202682 A1* 10/2003 Yanagisawa .............. G06T 7/20
382/103
2012/0154579 A1    6/2012 Hampapur et al.

FOREIGN PATENT DOCUMENTS

JP    2000-25700 A    1/2000
JP    2002-139319     5/2002
(Continued)

OTHER PUBLICATIONS

International Search Report issued Oct. 8, 2013 for PCT/JP2013/073872 filed on Sep. 5, 2013 (with English translation).
(Continued)

*Primary Examiner* — Siamak Harandi
*Assistant Examiner* — Amandeep Saini
(74) *Attorney, Agent, or Firm* — Oblon, McClelland, Maier & Neustadt, L.L.P (57) ABSTRACT A moving object detection method according to an embodiment performs a stacking process step of: dividing captured images into p groups each including m successive images; and for each group, applying a stacking method to the m images. Subsequently, for each group, the method extracts a candidate for space debris based on an evaluation value for space debris detection, which is obtained from pixel values at the same pixel positions overlapping one another across the m images superposed one another. Thereafter, the method judges whether the extracted candidate for the space debris in each group is chosen as a final candidate for the space debris based on the coincidence or proximity in terms of the movement direction and the moving velocity.

7 Claims, 6 Drawing Sheets

(56) References Cited

FOREIGN PATENT DOCUMENTS

| | | |
|---|---|---|
| JP | 2002-220098 A | 8/2002 |
| JP | 2002-220099 A | 8/2002 |
| JP | 2002-310616 A | 10/2002 |
| JP | 2003-323625 | 11/2003 |
| RU | 2 446 471 C1 | 3/2012 |
| WO | 2012/033159 A1 | 3/2012 |

OTHER PUBLICATIONS

International Written Opinion issued Oct. 8, 2013 for PCT/JP2013/073872 filed on Sep. 5, 2013.

Decision on Grant issued Apr. 25, 2016 in Russian Patent Application No. 2015111199/07.

* cited by examiner

MOVING OBJECT DETECTION METHOD

CROSS REFERENCE TO RELATED APPLICATION

The present application is a continuation application of International Application No. PCT/JP2013/073872, filed Sep. 5, 2013, which claims priority to Japanese Patent Application No. 2012-197532, filed Sep. 7, 2012. The contents of these applications are incorporated herein by reference in their entirety.

BACKGROUND OF THE INVENTION

1. Field of the Invention

The present invention relates to a method of detecting a moving object from captured images.

2. Description of the Related Art

Space debris is an out-of-service artificial object which orbits the Earth. A detection of the existence of the space debris is important for smooth operation of spacecraft (artificial satellites, space stations, space shuttles and the like). One method among conventional space debris detection methods determines the existence of space debris by extracting high-luminance parts respectively from images captured by a CCD (charge coupled device) camera on the Earth or on the orbit.

This method includes: cropping areas in the same size from three or more images captured at time intervals in accordance with the movement of a moving object such as space debris; and applying a stacking method to the cropped image areas. Here, the movement of the moving object is the uniform motion or the like having mobile vectors (velocities) in a two-dimensional direction in the xy-coordinate system, for example. To put it concretely, the cropped image areas are superposed on one another, and a median value is evaluated from pixel values at the same pixels across the superposed image areas. If the median value thus evaluated is equal to or greater than a predetermined value, the pixel is extracted as a pixel representing the existence of the moving object (see Japanese Patent Application Laid-open Publications Nos. 2002-139319 and 2003-323625, for example).

The stacking method is a widely-used effective method not only for detecting space debris, but also for detecting a moving object at a low luminance level in an image. Furthermore, as described above, the stacking method employs the median pixel value as the evaluation value for the moving object detection. Therefore, the stacking method causes no rise in the evaluation value even if a noise component happens to be captured in some of the images (for example, a star or a cosmic ray in the cosmic space is captured in some of the images), in contrast to another case in which an average pixel value is used as the evaluation value. For this reason, the stacking method is advantageous in inhibiting erroneous detection of a moving object due to the existence of a star or a cosmic ray which happens to be captured therein.

SUMMARY OF THE INVENTION

As described above, when the moving object is detected from the multiple images captured at time intervals using the stacking method, it is required to superpose the areas to be cropped from the respective images in a staggered manner by the amount of movement of the moving object in each image-photographing (image-capturing) interval so that objects captured in the images, which correspond to the detection object, are overlapped one another. However, as is often the case with space debris, for example, nothing is known about the movement (the vector direction and the scalar quantity) of the moving object in advance.

For this reason, areas suitable to be cropped from the images, which allow pictures of the space debris as the detection object to be superposed on one another in the staggered manner, have to be evaluated by trial and error, i.e. by cropping candidate areas from the respective images and superposing the candidate areas in a staggering manner both in various directions and by various amount. Such trial and error requires an enormous amount of processing work.

Let us assume, for example, a case where a moving object is detected from n images each with an image size $L=(Lx, Ly)$ by the aforementioned stacking method. Here, it is supposed that the x- and y-axis direction components of the moving velocity V which are given by $V=(\pm Vx, \pm Vy)$ when the moving velocity V of the moving object is expressed using a distance that the moving object moves in a time period corresponding to the overlaps between the pictures of the moving object. In this respect, let us further assume a case where a value of the velocity V and a value of the image size L are given by $Vx=Vy=200$ (i.e., $V=(\pm 200, \pm 200)$) and $Lx=Ly=2000$, respectively, when the moving velocity V and the image size L are expressed using the number of pixels; and the number of images to be used for the detection is given by $n=32$.

When the distance that the moving object moves in the time period corresponding to the overlaps is calculated by changing and superposing the pixels on a one-to-one basis, $(\pm Vx) \times (\pm Vy)$ velocities V can be supposed for the moving object. As a result, when evaluating the pixel values at the respective $(Lx \times Ly)$ pixels for all the imagined velocities, the number of needed operation processes amounts to $$(2Vx) \times (2Vy) \times (Lx) \times (Ly)$$

$$= 400 \times 400 \times 2000 \times 2000 = 6.4 \times 10^{11}.$$

These calculation processes are needed for each of the n images. Accordingly, when all the pixel values in all the pictures are evaluated, the total number of needed calculation processes is given by multiplying the above-mentioned number by 32, resulting in roughly $2.0 \times 10^{13}$.

Furthermore, the processing of evaluating a median value from pixel values at the same pixel positions across the n images needs to include: an arithmetic process of sorting the n pixel values; and a process of selecting a value lying at the middle point in a series of the pixel values arranged in an ascending (or descending) order as a result of the sorting. For this reason, the time needed for the calculation depends on the calculation needed for the sorting, and equals to the time needed to perform $$n \log(n)$$

comparison processes and assignment operations. Even in a case requiring the smallest amount of processes without sorting the values as a result of the comparison processes, the number of operations needed for the comparison processes and the assignment operations is $\log(n)$ times the number (n) of operations to be performed to evaluate a simple average pixel value. In usual cases, the values as a result of a comparison operation need to be sorted, and three assignment operations are additionally needed each time the values are sorted. For this reason, the number of operations needed for this processing is several times larger. This makes the processing become a heavily time-consuming task.

Furthermore, for a comparison operation for sorting the n pixel values, the processor performs a speculative execution after a comparison process. That is, after comparing a pair of pixel values selected from the n pixel values, the processor performs a speculative execution of "changing the order of the two pixel values" depending on the result of the comparison, or a speculative execution of "not changing the order of the two pixel values."

In this respect, let us assume a case where for a pair of pixel values, the processor performs the speculative execution of "changing the order of the two pixel values." If the pixel values, as the object of the speculative execution, happen to be arranged in an ascending or descending order, reverse to an order in which the processor sorts the two pixel values, the speculative execution performed by the processor is a success.

However, if from the beginning, the pixel values, as the object of the speculative execution, are arranged in an order in which the pixel values should be sorted, the speculative execution performed by the processor is a failure because: the processes following the speculative execution have to be suspended; the preceding work (the work based on the wrong result) has to be undone; and the preceding processes have to be resumed.

As is often the case, the speculative execution is performed on the assumption that a branch which is the same as that as a result of the previous execution will take place, and in a way that the process following the speculative execution is carried out by determining the contents of the execution before the conditions are settled. However, because the pixel values are arranged in a random order, there is a 50% probability that the result of the previous comparison is followed by the same result. For this reason, there is a 50% probability that the speculative execution performed by the processor ends in failure. Accordingly, there is a 50% probability that until work is resumed by undoing the previously-done work based on the wrong result, the work has to be suspended for a time length which is 10 to 20 times longer than the time length needed to perform the four basic arithmetic operations.

As described above, the method using the median value of the pixel values at the same pixel positions across the n images as the evaluation value for detecting the moving object is greatly advantageous in improving the detection accuracy, as compared with the method using the average value. In exchange for this advantage, the processor has to perform an enormous amount of arithmetic processing in order to evaluate the median value, as compared with evaluating the average value.

The present invention has been made with the foregoing situation taken into account. An object of the present invention is to provide a moving object detection method capable of accurately detecting a moving object or a candidate therefore using a stacking method with less operation processes than required when an evaluation value for the moving object detection is evaluated from pixel values at the same pixel positions across captured images with all of the captured images superposed one on another at one time.

An aspect of the present invention provides a method (a moving object detection method) for detecting a moving object being an observation object from images captured in constant intervals, based on an evaluation value obtained from pixel values at the same pixel positions overlapping one another across the images by sequentially moving the images in accordance with a content corresponding to an estimated movement content of the moving object being the observation object during the constant intervals. Here, the method includes: a judgment step of dividing the images into groups each including a predetermined number of images successive in time series, and for each group, judging whether or not each pixel is a candidate for a pixel capturing the moving object being the observation object based on the evaluation value obtained from the pixel values at the same pixel positions overlapping one another across the predetermined number of images by sequentially moving the images in accordance with the content corresponding to the estimated movement content; a check step of checking whether or not each group includes candidates for the pixel capturing the moving object being the observation object which coincide with one another in terms of the estimated movement content and a movement locus; and a detection step of detecting the moving object being the observation object in each image from the candidates for the pixel capturing the moving object being the observation object in each group which are confirmed to coincide with one another in terms of the estimated movement contents and movement locus.

The evaluation value may be evaluated, using a robust statistics on the assumption that there is no large difference among the pixel values, from the pixel values at the same pixel positions overlapping one another across the predetermined number of images by sequentially moving the images in accordance with the content corresponding to the estimated movement content. For each group, the judgment step may judge the pixels at the same pixel positions across the images as the candidates for the pixel capturing the moving object being the observation object, if the evaluation value obtained using the robust statistics is equal to or greater than a criterion value.

The method may further include: an average-value-of-limited-pixels calculating step of, for each group, calculating an average value of pixel values which are equal to or less than a threshold value for distinguishing the moving object being the observation object from a light emitting element with a higher luminance than that of the moving object, the pixel values being among the pixel values at the same pixel positions across the predetermined number of images. Here, for each group, the judgment step may judge the pixels at the same pixel positions across the images as the candidates for the pixel capturing the moving object being the observation object if the average value calculated in the average-value-of-limited-pixels calculating step is equal to or greater than a criterion value.

The method may further include: an average-value-of-all-pixels calculating step of, for each group, calculating an average value of all the pixel values at the same pixel positions across the images; and a threshold value calculating step of, for each group, calculating the threshold value by multiplying the average value calculated in the average-value-of-all-pixels calculating step by a predetermined number.

The estimated movement content may be uniform linear motion of the moving object being as observation object in an estimated movement direction thereof and with an estimated movement amount thereof. The moving object as the observation object may be detected from the images based on the evaluation value obtained from the pixel values at the same pixel positions overlapping one another across the images by sequentially moving the images by parallel displacement in the estimated movement direction of and with the estimated movement amount of the moving object being the observation object.

The estimated movement content may be uniform acceleration motion of the moving object being the observation object in an estimated movement direction thereof and with an estimated movement amount thereof which increases or decreases by a constant amount over time. The moving object being the observation object may be detected from the images based on the evaluation value obtained from the pixel values at the same pixel positions overlapping one another across the images by sequentially moving the images by parallel displacement in the estimated movement direction of and with the estimated movement amount of the moving object being the observation object.

The moving object being the observation object may be an object orbiting the earth. The images may be images captured in intervals during fixed-point observation.

When a moving object is detected using a stacking method, the present invention makes it possible to accurately detect a moving object using a stacking method with less operation processes than required when an evaluation value for the moving object detection is evaluated from pixel values at the same pixel positions across captured images with all of the captured images superposed one on another at one time.

DESCRIPTION OF THE PREFERRED EMBODIMENTS

Referring to the drawings, descriptions will be provided for an embodiment in which a moving object detection method of the present invention is applied to detection of space debris from photographed celestial images.

The moving object detection method of the embodiment is designed to detect space debris as a moving object being an observation object from the photographed celestial images. A described in a flowchart of FIG. 1, this method is designed to perform a photographing (capturing) and image reading process step (step S1), a preliminary process step (step S3), a stacking process step (step S5), a continuity evaluation process step (step S7) and a result check process step (step S9).

Figure 1:
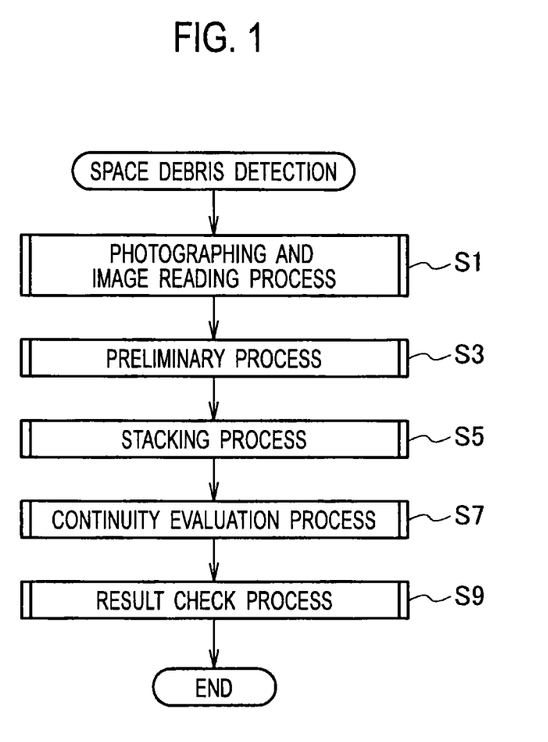
FIG. 1 is a flowchart showing a procedure in the case where a moving object detection method of the present invention is applied to detection of space debris from photographed astronomical images.
Figure 2:
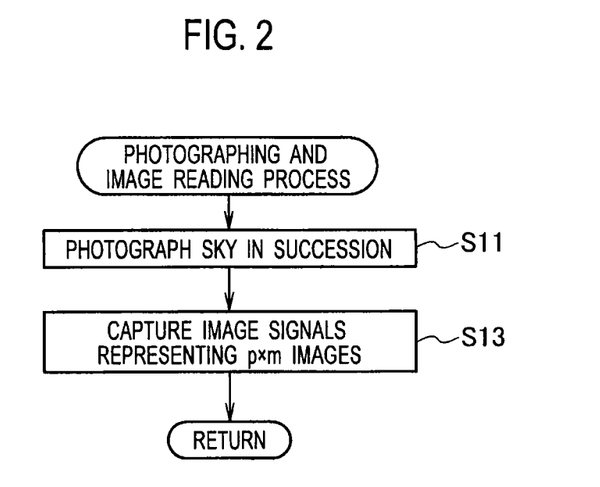
FIG. 2 is a flowchart showing a concrete procedure for a photographing (capturing) and image reading process step in the flowchart shown in FIG. 1.

As shown in the flowchart of FIG. 2, the photographing and image reading process step (step S1 in FIG. 1) begins with repeatedly making a series of photographs of a space (the sky), including the geostationary orbit of space debris, for a predetermined length of exposure time at constant time intervals (step S11). Subsequently, the image reading process step (step S1 of FIG. 1) ends with capturing image signals representing the captured images (step S13).

A photographing (capturing) apparatus (not illustrated) formed by connecting a CCD camera to an astronomical telescope, for example, may be used for taking the images of the sky. Furthermore, in the embodiment, the below-described stacking process step (step S5 in FIG. 1) is carried out p times, each time by using m images. In other words, the p×m images are photographed in succession by, and captured into the photographing apparatus.

Figure 3:
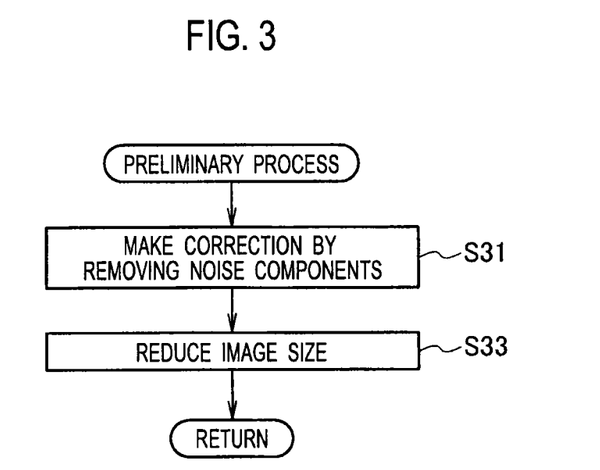
FIG. 3 is a flowchart showing a concrete procedure for a preliminary process step in the flowchart shown in FIG. 1.

Thereafter, as shown in the flowchart of FIG. 3, the preliminary process step (step S3 in FIG. 1) begins with making corrections to the image signals, captured from the photographing apparatus (not illustrated), by removing noise components included in the image signals (step S31). Afterward, the size of images representing the corrected image signals is reduced to an image size to be handled in the below-described stacking process step (step S5 in FIG. 5) (step S33). In the embodiment, the size of the images is reduced to a half in both the vertical and horizontal directions (to a quarter in terms of the area). Then, the largest pixel value in the 2×2 pixels before the reduction is assigned as a pixel value to one pixel after the reduction. Hence, the preliminary process step (step S3 in FIG. 1) is terminated.

In step S31, the corrections are made by removing the noise components. Specifically, the corrections are achieved by removing the noise components included in the signals representing the images captured by the photographing apparatus (not illustrated). A typical example of the noise components to be removed is an offset component of a CCD element in the CCD camera in the photographing apparatus.

The offset component of the CCD element is a noise component which occurs when an image of a photographic object captured by the astronomical telescope of the photographing apparatus (not illustrated) is converted into an electric signal by the CCD element in the CCD camera. To put it concretely, when an output has to correspond to a zero luminance (i.e., when the quantity of light from the photographic object is at zero), the CCD element may, in some cases, shift (offset) an actual output from the point zero. Furthermore, the contents of the offset vary from one CCD element to another.

As a measure to counter this, when an object at a zero luminance is photographed, the offset component of the CCD element is corrected (i.e., subjected to offset correction) in order that the image signal outputted from the photographing apparatus becomes "0." Incidentally, the offset correction of this case is termed as dark correction. The correction value can be obtained by evaluating a value of the output from the CCD element at the time of photographing while blocking the light receiving unit from light.

Subsequently, the correction value thus evaluated is subtracted from the pixel value at each of the pixels which corresponds to an image of the sky photographed by the photographing apparatus for the moving object detection. This makes it possible to correct the offset component of the CCD element.

Another typical example of the noise components to be removed from the image signals in step S31 is a noise component attributed to a star. The noise component attributed to the star occurs when the star existing in the sky is captured into the images with the star and its surrounding area expressed as blurred dots or lines in accordance with the moving velocity of the star.

The noise component attributed to the star can be eliminated from each image by subtracting the pixel values at the same pixel positions in two images that are overlapped each other by parallel displacement with the already-known amount of movement of the star in the already-known movement direction of the star. Here, one of the two images is an image captured by the photographing apparatus (not illustrated), and another image is its preceding or following image captured in succession by the photographing apparatus.

To this end, the noise component of the image signals attributed to the star is eliminated after the dark correction to the offset component of the CCD element by: superposing each two successive images of the sky captured by the photographing apparatus for the moving object detection by moving the two successive images by parallel displacement in accordance with the direction and amount of the movement of the star; and subtracting the pixel values at the pixels overlapping each other. The foregoing may be employed as the contents of the correction to be made by removing the noise components in step S31 of FIG. 3.

Figure 4:
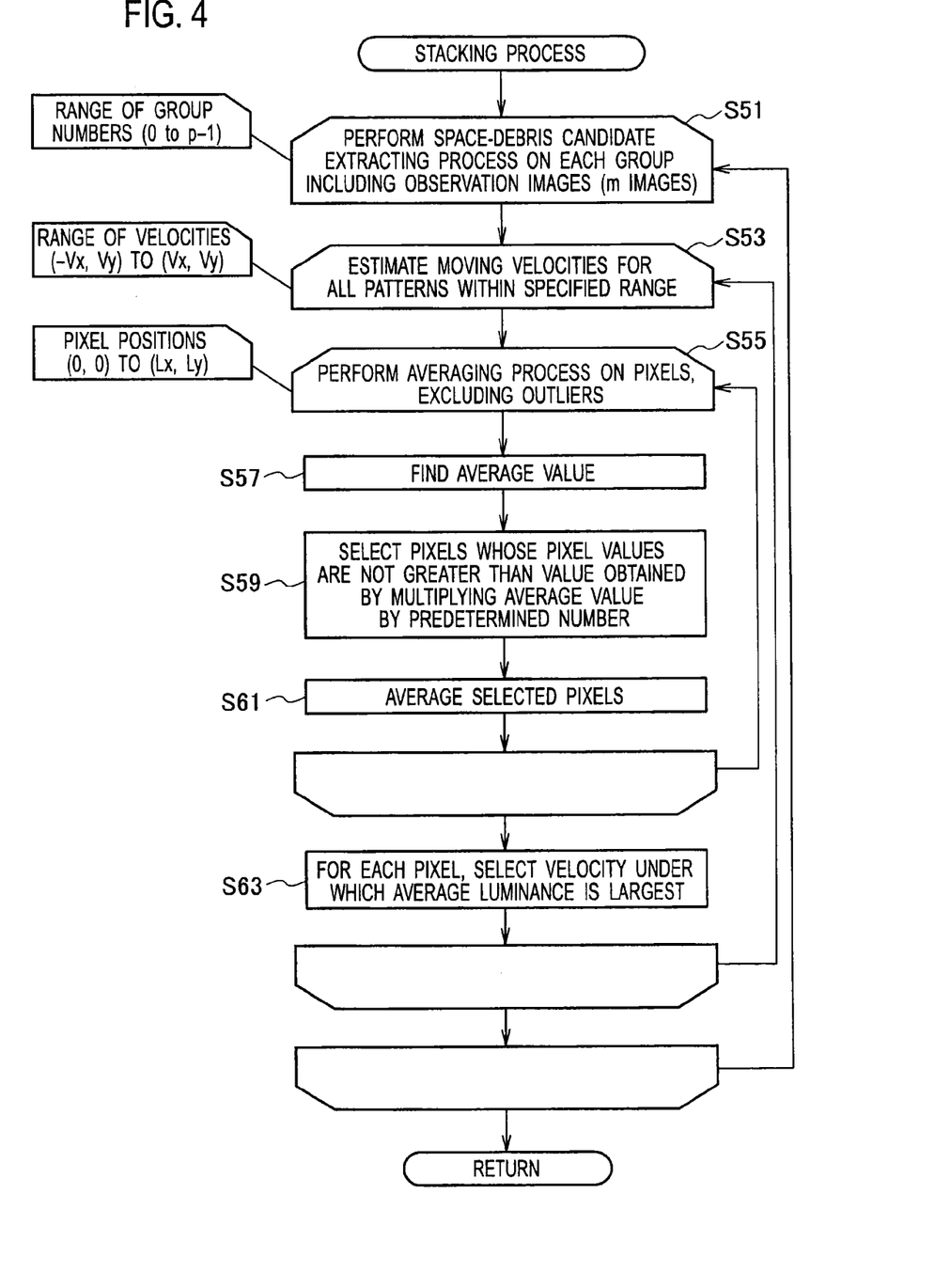
FIG. 4 is a flowchart showing a concrete procedure for a stacking process step in the flowchart shown in FIG. 1.

Then, as shown in the flowchart of FIG. 4, the stacking process step (step S5 in FIG. 1) begins with: dividing the p×m images (whose image size is L=(Lx, Ly)), photographed in succession by the photographing apparatus (not illustrated) at the constant time intervals, into p groups (sets) each including the successive m images; and for each group (p=0 to p−1), subjecting the m images to the stacking method, and thereby extracting the candidate for the space debris (step S51).

The process of extracting the candidate for the space debris from the m images is achieved by performing calculation using the pixel values at the same pixel positions overlapping one another while, by parallel displacement, sequentially moving each image by its estimated moving velocity of the space debris (i.e., a length (distance or interval) of the movement of the space debris on the image at its estimated moving velocity within a predetermined time length). Sequentially changing the estimated moving velocity of the space debris in a range of (−Vx/p, −Vy/p) to (Vx/p, Vy/p), this calculation is performed on each estimated moving velocity (step S53). In this respect, the reason why the range of the estimated moving velocity is 1/p is that: the time length is 1/p; and the distance of the movement within the entire time length is also 1/p.

Furthermore, the calculation using the pixel values at the same pixel positions overlapping one another across the m images is performed for each of pixel positions (whose pixel coordinates are (0, 0) to (Lx, Ly)) of each image. To put it concretely, an averaging process is performed on the pixel values of the pixels, excluding the pixel values of pixels (outliers) not satisfying a condition, at the same pixel positions overlapping one another across the m images which are sequentially moved by parallel displacement by the estimated moving velocity V of the space debris (step S55). In this respect, the condition means "being less than a threshold value obtained by multiplying the average value of the pixels values of the pixels by a predetermined number."

The threshold value is used to distinguish the space debris from an object which emits light at a higher luminance than the space debris (corresponding to a high-luminance light emitting element in the CLAIMS). What value the threshold value should be set at is a very important parameter for a value calculated by the following process to reflect less of the luminance (pixel value) of a moving object whose luminance (pixel value) greatly differs from the luminance of the space debris.

For this reason, the threshold value is set based on the average value of all the pixel values at the same pixel positions across the superposed images (by multiplying the average value of all the pixel values by the predetermined number). The employment of the threshold value as a criterion for the luminance (pixel value) of the space debris makes it possible to accurately distinguish a pixel whose luminance (pixel value) greatly differs from the criterion luminance (pixel value), as a pixel representing the existence of a light emitting object which is not the space debris, from a pixel representing the existence of the space debris.

Meanwhile, the above-mentioned "predetermined number" that dominates the threshold value can be set at an appropriate value using a statistical method. The predetermined value may be set in a range of 1.5 to 3, for example. The following descriptions will be provided for the embodiment in which the predetermined number is set at 2.

First of all, the m images belonging to one group (p=0 to p−1) set in step S51 are sequentially moved by parallel displacement by the estimated moving velocity (one of (−Vx/p, −Vy/p) to (Vx/p, Vy/p)) of the space debris set in step S53. Subsequently, an average value of the pixel values at the same object pixel positions ((0, 0) to (Lx, Ly)) overlapping one another across the superposed images set in step S55 is evaluated (step S57).

Thereafter, using the threshold value obtained by multiplying the evaluated average value by two (the predetermined number), pixels whose pixel values are equal to or less than the threshold value are selected (step S59). An average value of the pixel values of the selected pixels is calculated (step S61). It should be noted that the average value calculation in step S61 is judged as being impossible if the proportion of pixels whose pixel values are equal to or less than 0.5 times the average value evaluated in step S57 to all the pixels exceeds 50%.

Thereafter, the calculation using the pixel values at the same pixel positions overlapping one another across the superposed m images is performed on each of the pixel positions (whose pixel coordinates are (0, 0) to (Lx, Ly)) (step S55 to step S61). Thereafter, each time the estimated moving velocity V of the space debris used to sequentially move the m images by parallel displacement is changed from one to another in a range of (−Vx/p, −Vy/p) to (Vx/p, Vy/p) (step S53), an estimated moving velocity V under which the average value evaluated in step S61 is the largest is selected (or updated) (step S63).

Furthermore, once the estimated moving velocity V under which the average value evaluated in step S61 is the largest is selected (or updated) based on the average values which are evaluated in step S61 for all the estimated moving velocities V (V=(−Vx/p, −Vy/p) to (Vx/p, Vy/p)) (step S53 to S63), the forgoing processes are executed for all the remaining groups (p=0 to p−1).

Once the foregoing processes are completed for all the groups (p=0 to p−1) (steps S51 to S63), the stacking process step (step S5 in FIG. 1) is terminated.

It should be noted that in steps S55 to S61, a median value or an average value of the pixel values at the same pixel positions overlapping one another across the m images may be evaluated as the evaluation value for the space debris detection instead of evaluating the evaluation value based on the averaged value of the pixel values at the same pixel positions overlapping one another across the m images.

Figure 5:
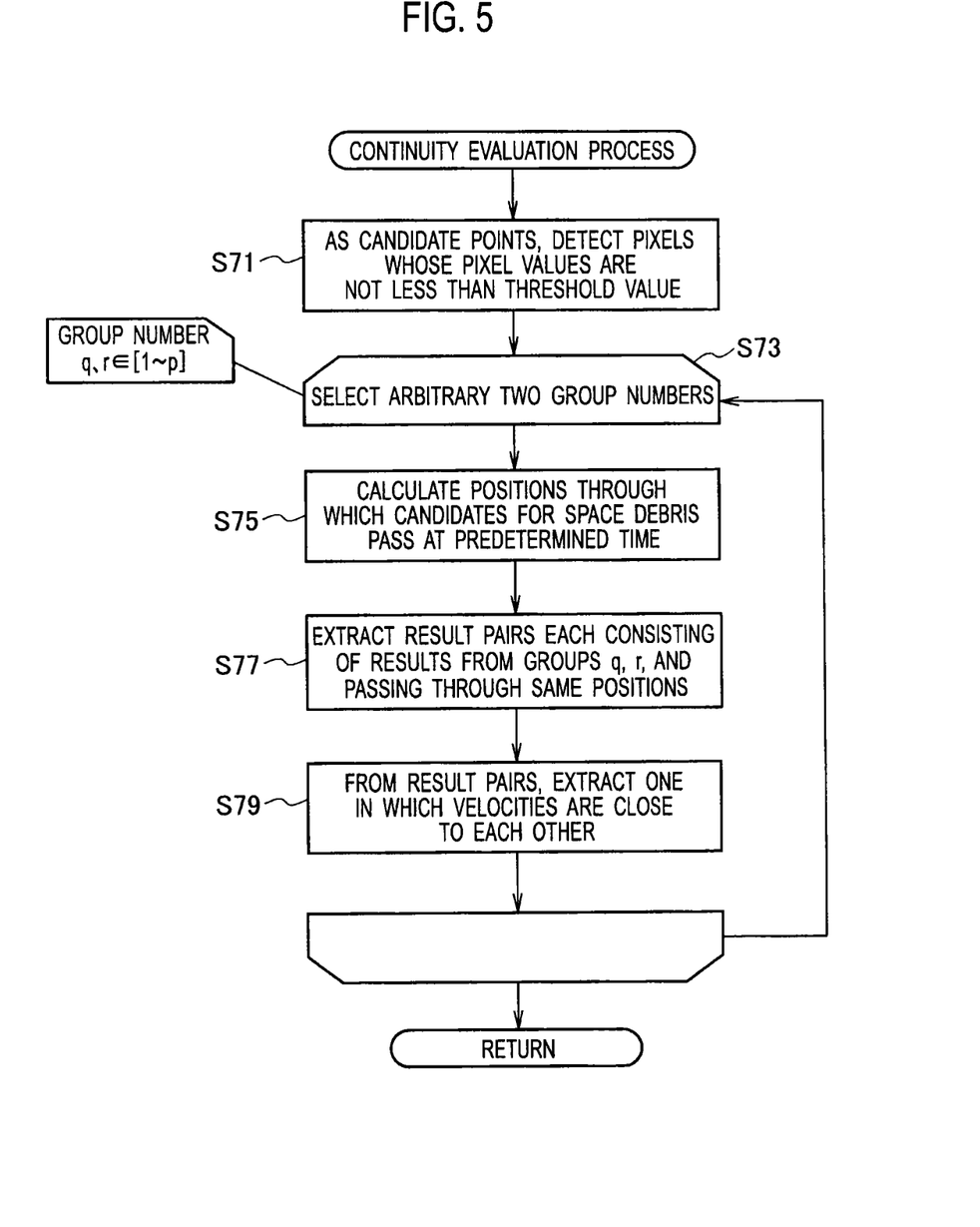
FIG. 5 is a flowchart showing a concrete procedure for a continuity evaluation process step in the flowchart shown in FIG. 1.

Next, as shown in a flowchart of FIG. 5, the continuity evaluation process step (step S7 in FIG. 1) begins with detecting pixels whose pixel values are equal to or greater than a threshold value (a candidate criterion value, corresponding to a criterion value in the CLAIMS) required for determining a candidate for the space debris, as candidate points for the space debris (step S71). It should be noted that these pixels also represent the pixels, with which the average value of their pixel values evaluated in step S61 based on the estimated moving velocity V selected in step S63 becomes the largest. Subsequently, two arbitrary groups (q, r ∈[1, p]) are selected from the p groups (step S73). For each group q, r, it is calculated as to which pixel in each image the candidate for the space debris detected in step S71 passes through at common predetermined time (step S75).

Figure 6:
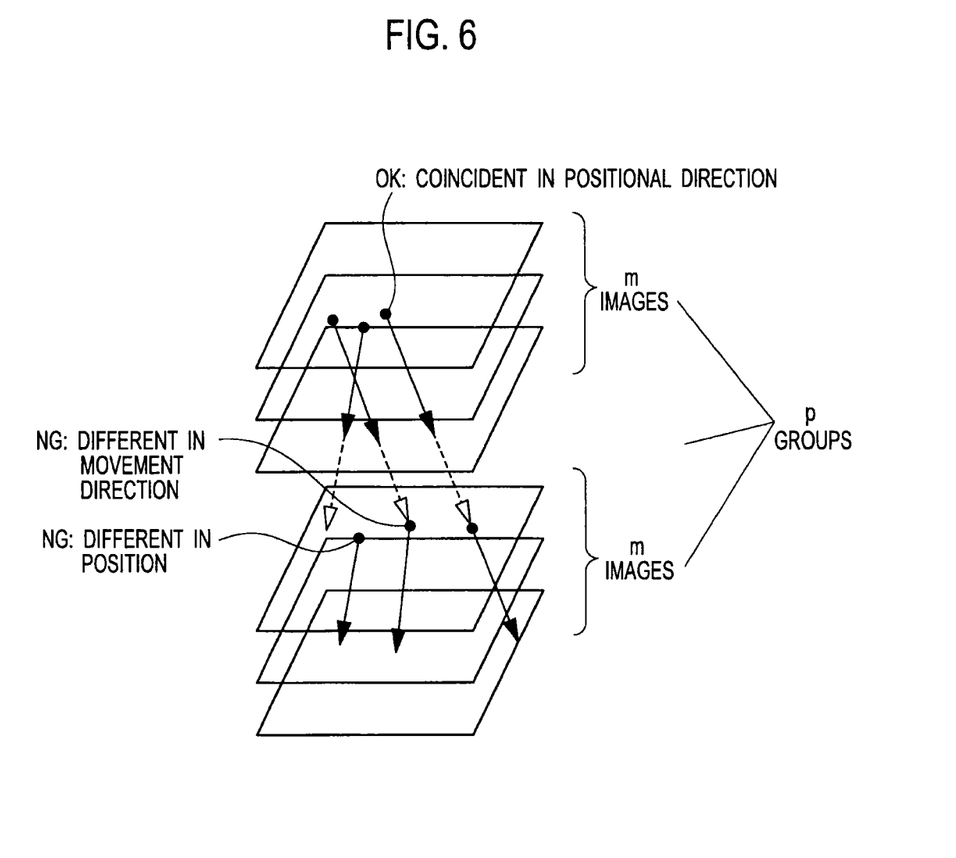
FIG. 6 is an explanatory diagram schematically showing contents of the procedure for the continuity evaluation process step shown in FIG. 5.

Thereafter, pairs each consisting of a candidate for the space debris from the group q and a candidate for the space debris from the group r, which pass through the same pixel positions (or alternatively, adjacent pixel positions within given ranges) at the predetermined time, are extracted (step S77). For example, a schematic diagram in FIG. 6 shows that, of three candidate points for the space debris captured in an uppermost image in the lower group in the diagram, two are situated on extension lines from the loci of the movement of two of three candidate points for the space debris captured in each image of in the upper group in the diagram. For this reason, the two candidate points correspond to the pair passing through the same pixel positions at the predetermined time.

Subsequently, from the pairs of candidates for the space debris extracted in step S77 (see FIG. 5), a pair of candidates for the space debris whose estimated moving velocities V in the respective groups q, r are close to each other (i.e., fall within a given error range) are extracted as final candidates for the space debris (step S79). For example, a schematic diagram in FIG. 6 shows that: the candidate points for the space debris marked with "OK: coincident in positional direction" are in the same positional direction in both the upper and lower groups in the diagram. For this reason, this pair corresponds to a pair sharing the same estimated moving velocity V inclusive of the directional components.

On the other hand, the candidate points for the space debris marked with "NG: different in movement direction" are different from each other in the movement direction between the upper and lower groups in the diagram. For this reason, this pair does not correspond to the pair sharing the same estimated moving velocity V inclusive of the directional components.

Furthermore, the candidate points for the space debris marked with "NG: different in position" are in the same movement direction in both the upper and lower groups in the diagram. However, the candidate point for the space debris captured in the uppermost image in the lower group in the diagram is not situated on the extension line from the movement locus of the candidate point for the space debris captured in the images in the upper group in the diagram. For this reason, this pair does not correspond to the pair passing through the same pixel position at the predetermined time.

In addition, estimated luminances c of the candidates for the space debris from the groups q, r extracted in step S77 are calculated in step S79. As for the pair of candidates for the space debris extracted in step S79 as the final candidates for the space debris, the estimated luminances c of the corresponding candidates for the space debris from the groups q, r are calculated using an equation $c=\sqrt{(a \times b)}$, where a and b denote the maximum average pixel values (selected in step S63 of FIG. 4) concerning the candidate points, respectively. As for the other pairs of candidates for the space debris in the groups q, r, which are not extracted as the final candidates for the space debris, their estimated luminances c are set at c=0.

Once the final candidates of the space debris are extracted from the respective groups q, r and their luminances c are calculated (step S73 to step S79), final candidates for the space debris are extracted from another pair of groups, and their luminances c are calculated. In this respect, for example, if the number of groups p is three, the final candidates for the space debris are extracted from Groups 1, 2, and from Group 2, 3; and their luminances c are calculated. Here, the final candidates for the space debris may further be extracted from Groups 1, 3, and their luminances c may be calculated as well. The continuity evaluation process step (step 7 in FIG. 1) is hence terminated.

Figure 7:
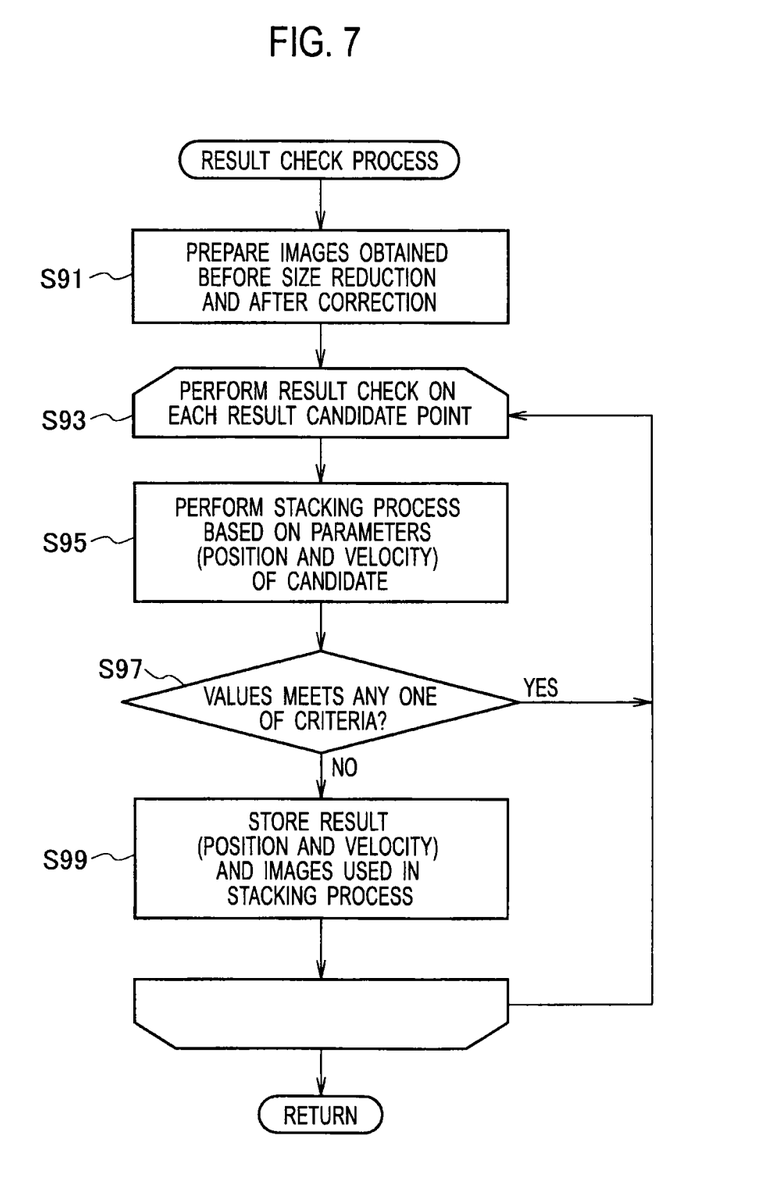
FIG. 7 is a flowchart showing a concrete procedure for a result check process step in the flowchart shown in FIG. 1.

Then, as shown in a flowchart in FIG. 7, in the result check process step (step S9 in FIG. 1), for all the pairs extracted in step S77 as the final candidates for the space debris, the m images before the size reduction in step S33 of FIG. 3 but after the correction in step S31 of FIG. 3 are firstly prepared from each of the groups to which the pairs belong (step S91). Subsequently, using the thus-prepared images, each final candidate is checked on whether or not it should be detected as the space debris (step S93).

For this check process, the stacking process to be performed in the stacking process step in step S5 of FIG. 5 is performed on the final candidate for the space debris by use of the images before the size reduction which are prepared in step S91 (step S95). In this process, the pixel value of the candidate for the space debris from each of the groups corresponding to the final pair of candidates for the space debris is set at the estimated luminance c calculated in step S79 of FIG. 5.

Thereafter, a judgment is made on whether any one of the following criteria is met: a criterion that the average pixel value at the candidate point for the space debris obtained as a result of the stacking process is equal to or less than the threshold value (the candidate criterion value, corresponding to the criterion value in the CLAIMS) required for the candidate point to be selected as a candidate for the space debris, which is used in the process of step S71 in FIG. 5; a criterion that the pixel values of a majority of the adjacent pixels are equal to or less than the average pixel value; and a criterion that the pixel values of a majority of the adjacent pixels are less than 70% of the threshold value. If one of the criteria is met (if YES in step S97), the process returns to step S93.

On the other hand, if none of the criteria is met, i.e., if the average pixel value at the candidate point for the space debris is greater than the threshold value (the candidate criterion value, corresponding to the criterion value in the CLAIMS) required for the candidate point to be selected as a candidate for the space debris and if the majority of the adjacent pixels fall outside the above-mentioned criteria (if NO in step S97), what is captured at the candidate point is detected as a part of the space debris represented by the pixel at the candidate point and its adjacent pixels having similar pixel values, and which takes on a circular or elliptical shape as a whole. Then, the result of the detection is stored together with the images used in the stacking process in step S95 (step S99).

The embodiment has described that both the brightness at the candidate point and the brightness of its adjacent pixels are used as the criteria for making the judgment on the space debris. It should be noted, however, that the judgment may be made on the space debris based on either brightness.

Once the processes from step S93 through step S99 are completed on all the final candidates for the space debris, the result check process step (step S9 in FIG. 1) is terminated.

As clear from the foregoing descriptions, the process in step S71 in FIG. 5 concerning the embodiment corresponds to a judgment step in the CLAIMS. In addition, the processes from step S7 through step S9 in the flowchart of FIG. 1 concerning the embodiment correspond to a detection step in the CLAIMS. Furthermore, the process in step S61 in the flowchart of Fig. concerning the embodiment corresponds to an average-value-of-limited-pixels calculating step in the CLAIMS.

Moreover, the process in step S57 in FIG. 4 concerning the embodiment corresponds to an average-value-of-all-pixels calculating step in the CLAIMS. Besides, the process in step S59 in FIG. 4 concerning the embodiment corresponds to a threshold value calculating step in the CLAIMS.

In the space debris detection method performed with the above procedures, the captured images are divided into the p groups each including the m successive images, and for each group, the stacking process step using the stacking method in step S5 in FIG. 1 is performed on the m images. Thereafter, for each group, the continuity evaluation process step in FIG. 5 judges, using the coincidence or proximity in the movement direction or moving velocity as a criterion, whether or not the candidates for the space debris extracted in the stacking process step in FIG. 5 can be adopted as final candidates for the space debris.

In this respect, let us assume that: the estimated moving velocity V of the space debris (the distance that the space debris moves in a time period corresponding to the overlaps) is given by $V=(\pm Vx, \pm Vy)$; the image size L is given by $L=(Lx, Ly)$; the estimated velocity V and the image size L are given by $Vx=Vy=200$ (i.e., $V=(\pm 200, \pm 200)$) and $Lx=Ly=2000$, respectively; the number of images to be used for the detection is given by $n=32$; and the number of groups into which the images are divided is given by $p=2$.

To begin with, let us assume a case that as the evaluation value for the space debris detection, the average value of the pixel values equal to or less than the threshold, which is selected in step S59 in FIG. 4, is evaluated like in step S61 in FIG. 4.

When the distance that the space debris moves in the time period corresponding to the overlaps is calculated by changing and superposing the pixels on a one-to-one basis, $(\pm Vx) \times (\pm Vy)$ moving velocities V can be estimated for the moving object. As a result, when evaluating the average value of the pixel values of the respective ($Lx \times Ly$) pixels for all the estimated moving velocities, the below-given number of operation processes need to be performed on each image twice (once for the positional component, and once for the velocity component):

$$(2Vx) \times (2Vy) \times (Lx) \times (Ly)$$

$$=400 \times 400 \times 2000 \times 2000 = 6.4 \times 10^{11}.$$

To this end, the set of operation processes are performed on the 32 images twice. In other words, the above-given number of operation processes is multiplied by 64. As a result, the needed number of operation processes amounts to approximately $$4.1 \times 10^{13}.$$

In contrast, when the operation processes are divided into halves to be performed on the respective two groups, the estimated number of moving velocities V of the moving object (the distance that the moving object moves in the time period corresponding to the overlaps) is reduced to a half of the number of moving velocities V of the moving object which is estimated when the operation processes are not divided into the halves. As a result, $(\pm Vx/2) \times (\pm Vy/2)$ moving velocities V can be estimated. Accordingly, for each moving velocity V, the evaluating of the average value of the pixel values of the (Lx, Ly) pixels requires the below-given number of operation processes to be performed on each image twice (once for the positional component and once for the velocity component):

$$(2Vx/2) \times (2Vy/2) \times (Lx) \times (Ly)$$

$$=200 \times 200 \times 2000 \times 2000 = 1.6 \times 10^{11}.$$

To this end, the set of operation processes are performed on the 32 images twice. In other words, the above-given number of operation processes is multiplied by 64. As a result, the needed number of operation processes is approximately $$1.0 \times 10^{13}$$

(which is a quarter of the number of operation processes which is needed when the operation processes are not divided into the halves to be performed on the respective two groups).

Next, let us assume a case where as the evaluation value for the space debris detection, a median value of the pixel values at the same pixel positions across the superposed 32 images is evaluated.

Since a process of evaluating a median value of the pixel values of the corresponding pixels across n images is an operation process to be performed to sort the n pixel values, the process requires $$n \log(n)$$

comparison processes, and assignment operations. When 32 is substituted for n in this expression, $$32 \log 32$$

is obtained. This means approximately $$1.0 \times 10^{14}$$

operation processes are performed.

When the n images are divided into the p groups and the approximately $1.0 \times 10^{14}$ operation processes are performed on each group, a median value of the pixel values of the n/p images is evaluated for each group. For this reason, the following number of comparison processes and assignment operations are performed:

$$p \times (n/p) \log(n/p) = n \log(n/p).$$

When 32 and 2 are respectively substituted for n and p in this expression, $$32 \log 16$$

is obtained. This means that the needed number of operation processes is approximately $$2.0 \times 10^{13}$$

(which is one-fifth of the number of operation processes which is needed when the operation processes are not divided into the halves to be performed on the respective two groups).

As described above, the detection of candidate points for the space debris using the stacking method is performed on each group. For each group, whether or not each of the candidate points represents the space debris is judged based on the coincidence in the movement amount and the movement locus among the candidate points. When the space debris is detected using the stacking method, this makes it possible to accurately detect candidates for pixels capturing the space debris, and consequently the space debris itself, with less operation processes than required when the evaluation value for the space debris detection is evaluated from the pixel values of the same pixel positions across the captured images with all of the captured images superposed one on another at one time.

Furthermore, when like in the embodiment, the captured images are divided into the groups and the stacking process step is performed on each group, the judgment on whether or not the candidates for the space debris detected from each group are continuous to one another in terms of the movement direction, moving velocity and moving position can be added to the judgment on whether or not the candidates for the space debris represent the space debris. Thereby, the space debris can be accurately detected even though the average pixel value requiring the less operation processes is used as the evaluation value for the space debris detection.

Furthermore, when as the evaluation value for the space debris detection, the average value or an evaluation value based on the average value is employed instead of the median value, there is an approximately 2% probability that the processor fails in the speculative execution due to a star or the like being captured in images. This is because when the processor performs the speculative execution in the operation processes to evaluate the average value, there is an approximately 2% probability that a moving object such as the star, other than the space debris, exists in the captured images. This failure probability is far lower than the 50% probability that the speculation execution ends in failure when the median value is evaluated through the n log(n/p) comparison processes and assignment operations. This makes the probability of unnecessary. operation processes due to the failure in the speculative execution far lower than when the median value is calculated. For this reason, the load of the operation processes can be further reduced.

Moreover, in the space debris detection method of the embodiment, the threshold value obtained by multiplying the average value of the pixel values at the same pixel positions across the superposed images by the predetermined number (two, for example) is used to distinguish the space debris from an object which emits light at a higher luminance than the space debris (corresponding to the high-luminance light emitting element in the CLAIMS).

For this reason, the average pixel value reflects less of the luminance (pixel value) of the high-luminance light emitting element (noise component), such as a star or a cosmic ray in the cosmic space captured in pixels, than the average value evaluated by simply averaging the pixel values at the same pixel positions across the superposed images. In other words, the average value evaluated by averaging only the pixel values which are equal to or less than the threshold value obtained by multiplying the average value of the pixel values at the same pixel positions across the superposed images by the predetermined number (two, for example) is closer to the luminance (pixel value) of the space debris than is the average pixel value obtained by simply averaging the pixel values at the same pixel positions across the superposed images.

Accordingly, when the space debris is detected using the stacking method, the employment of the average value of the pixel values equal to or less than the threshold value as the evaluation value for the space debris detection makes it possible to accurately detect a candidate for a pixel capturing the space debris, and consequently the space debris itself, with less operation processes than required when the median value evaluated from the pixel values at the same pixel positions across the superposed images is used as the evaluation value for the space debris.

Note that it is desirable that a statistical value, such as the average value of the pixel values of the same pixel positions across the superposed images, be used when as described above, the evaluation value for detecting the space debris or candidate points for the space debris is calculated from the pixel values at the same pixel positions across the superposed images. It is further desirable that the points corresponding to the pixel values equal to or greater than the threshold value, which are evaluated using the median value or a robust statistics method with outlier values taken into consideration, such as the RANSAC estimation method or the LMedS estimation method, be detected as candidate points for the space debris.

The above-mentioned threshold value, however, may be determined independently of the average value of the pixel values at the same pixel positions across the superposed images. Moreover, the threshold value like this does not have to be used.

In addition, the foregoing descriptions have been provided for the embodiment in which the present invention is carried out as the space debris detection method. Nevertheless, the present invention is broadly applicable to the detection of a moving object other than the space debris from images captured in constant intervals using the stacking method, for example, the identification and detection of an object other than the space debris, such as an artificial satellite orbiting the earth, or colored microbes, on captured images.

Furthermore, the foregoing descriptions have been provided for the embodiment while citing the example of performing the stacking method on the moving object, the observation object, in uniform linear motion on the images in the estimated movement direction and with the estimated movement amount. Nevertheless, the present invention is applicable, as well, to a case of performing a stacking method on a moving object, an observation object, in uniform acceleration motion on the images with the estimated movement amount which increases or decreases by a constant amount over time.

In the embodiment, the images captured in constant intervals are divided into the groups each including the predetermined number of images successive in time series. If in each group, the candidates judged to represent the moving object, the observation object, in the respective images coincide with one another in terms of the estimated movement contents (estimated motion parameters) and movement locus, the candidates are judged as representing the same moving object. Thereby, the moving object, the observation object, is finally recognized and detected.

In this detection, when the number of images is n, the number of operation processes for evaluating the median value of the pixel images at the same pixel positions across the superposed images decreases from n log(n) required when the median value is evaluated by superposing all the images to (n/p)log(n/p) multiplied by p, the number of groups, (=n log(n/p)) required depending on the number of images (n/p) included in each group. Furthermore, the number of operation processes for judging whether or not the candidates for the pixels capturing the moving object, the observation object, in the respective groups coincide with one another in terms of the estimated movement contents and movement locus is not so large, since the operation processes are performed through the comparison among the values.

As a result, since the evaluation value for the moving object, the observation object, is evaluated using the stacking method to be performed on each of the groups into which the captured images are divided, the moving object can be accurately detected with less operation processes than required when the evaluation value for the moving object detection is evaluated from the image values at the same pixel positions across the captured images with all of the images superposed one on another at one time.

In the embodiment, the average value calculated in the average-value-of-limited-pixels calculating step is the average value of the pixel values at the same pixel positions across the images, excluding a pixel value corresponding to the high-luminance light emitting element whose luminance (pixel value) is greatly higher than the luminance (pixel value) of the moving object, the observation object, on the images. For this reason, the average value calculated in the average-value-of-limited-pixels calculating step is the average pixel value which reflects less of the luminance (pixel value) of the high-luminance light emitting element (noise component), such as a star or a cosmic ray in the cosmic space captured in pixels, than the average value evaluated by simply averaging the pixel values at the same pixel positions across the images. In other words, the average pixel value calculated in the average-value-of-limited-pixels calculating step is closer to the luminance (pixel value) of the moving object, the observation object, than is the average pixel value obtained by simply averaging the pixel values at the same pixel positions across the superposed images.

Moreover, in order to calculate the average pixel value, the processor performs either a speculative execution of "performing an addition operation for the purpose of calculating an average value" or a speculative execution of "not performing an addition operation for the purpose of calculating an average value" on the pixel values at the same pixel positions across the images. As long as the proportion of the existence of the high-luminance light emitting element in each image is not so high that many of the pixels in the image display the high-luminance light emitting element, the speculative execution to be performed by the processor is the speculative execution of "performing an addition operation for the purpose of calculating an average value" by a probability of sufficiently higher than 50%, and succeeds by a probability of sufficiently higher than 50%. For this reason, the influence of an increase in the amount of operation processes as a result of the failure in the speculative execution is small.

Accordingly, when the moving object is detected using the stacking method, the employment of the average pixel value calculated in the average-value-of-limited-pixels calculating step as the evaluation value for the moving object detection makes it possible to accurately detect a pixel capturing the moving object, the observation object, or the candidate therefore with less operation processes than required when the median value evaluated from the pixel values at the same pixel positions across the superposed images is used as the evaluation value for the moving object.

What value the threshold value for distinguishing the moving object, the observation object, from the high-luminance light emitting element should be set at is a very important parameter for the average value calculated in the average-value-of-limited-pixels calculating step to reflect less of the luminance (pixel value) of the high-luminance light emitting element whose luminance (pixel value) greatly differs from the luminance of the moving object, the observation object.

For this reason, the threshold value is set based on the average value of all the pixel values at the same pixel positions across the superposed images (by multiplying the average value of all the pixel values by the predetermined number). The employment of the threshold value as a criterion for the luminance (pixel value) of the moving object, the observation object, makes it possible to accurately distinguish a pixel whose luminance (pixel value) greatly differs from the criterion luminance (pixel value), as a pixel representing the existence of the high-luminance light emitting element, from a pixel representing the existence of the moving object, the observation object.

Even if a star, a cosmic ray and the like are captured in the images at higher luminance than the object orbiting the earth which is the moving object as the observation object, the embodiment makes it possible to accurately detect the object orbiting the earth from the images with the less operation processes.

When the moving object is detected using the stacking method, the embodiment makes it possible to accurately detect the moving object with less operation processes than required when the evaluation value for the moving object detection is evaluated from the pixel values at the same pixel positions across the captured images with all of the captured images superposed one on another at one time.

What is claimed is:

1. A method for detecting a moving object being an observation object from images captured in constant intervals, based on an evaluation value obtained from pixel values at the same pixel positions overlapping one another across the images by sequentially moving the images in accordance with a content corresponding to an estimated movement content of the moving object being the observation object during the constant intervals, comprising:

a judgment step of dividing the images into groups each including a predetermined number of images successive in time series, and for each group, judging whether or not each pixel is a candidate for a pixel capturing the moving object being the observation object based on the evaluation value obtained from the pixel values at the same pixel positions overlapping one another across the predetermined number of images by sequentially moving the images in accordance with the content corresponding to the estimated movement content;

a check step of checking whether or not each group includes candidates for the pixel capturing the moving object being the observation object which coincide with one another in terms of the estimated movement content and a movement locus; and a detection step of detecting the moving object being the observation object in each image from the candidates for the pixel capturing the moving object being the observation object in each group which are confirmed to coincide with one another in terms of the estimated movement contents and movement locus.

2. The method according to claim 1, wherein the evaluation value is evaluated, using a robust statistics on the assumption that there is no large difference among the pixel values, from the pixel values at the same pixel positions overlapping one another across the predetermined number of images by sequentially moving the images in accordance with the content corresponding to the estimated movement content, and for each group, the judgment step judges the pixels at the same pixel positions across the images as the candidates for the pixel capturing the moving object being the observation object, if the evaluation value obtained using the robust statistics is equal to or greater than a criterion value.

3. The method according to claim 1, further comprising an average-value-of-limited-pixels calculating step of, for each group, calculating an average value of pixel values which are equal to or less than a threshold value for distinguishing the moving object being the observation object from a light emitting element with a higher luminance than that of the moving object, the pixel values being among the pixel values at the same pixel positions across the predetermined number of images, wherein for each group, the judgment step judges the pixels at the same pixel positions across the images as the candidates for the pixel capturing the moving object being the observation object if the average value calculated in the average-value-of-limited-pixels calculating step is equal to or greater than a criterion value.

4. The method according to claim 1, further comprising:

an average-value-of-all-pixels calculating step of, for each group, calculating an average value of all the pixel values at the same pixel positions across the images; and a threshold value calculating step of, for each group, calculating the threshold value by multiplying the average value calculated in the average-value-of-all-pixels calculating step by a predetermined number.

5. The method according to claim 1, wherein the estimated movement content is uniform linear motion of the moving object being the observation object in an estimated movement direction thereof and with an estimated movement amount thereof, and the moving object being the observation object is detected from the images based on the evaluation value obtained from the pixel values at the same pixel positions overlapping one another across the images by sequentially moving the images by parallel displacement in the estimated movement direction of and with the estimated movement amount of the moving object being the observation object.

6. The method according to claim 1, wherein the estimated movement content is uniform acceleration motion of the moving object being the observation object in an estimated movement direction thereof and with an estimated movement amount thereof which increases or decreases by a constant amount over time, and the moving object being the observation object is detected from the images based on the evaluation value obtained from the pixel values at the same pixel positions overlapping one another across the images by sequentially moving the images by parallel displacement in the estimated movement direction of and with the estimated movement amount of the moving object being the observation object.

7. The method according to claim 1, wherein the moving object being the observation object is an object orbiting the earth, and the images are images captured in intervals during fixed-point observation.

* * * * *